United States Patent
Suk et al.

(10) Patent No.: US 9,130,486 B2
(45) Date of Patent: Sep. 8, 2015

(54) MOTOR POSITION DETECTING UNIT AND BRUSHLESS DC MOTOR SYSTEM

(71) Applicant: Electronics and Telecommunications Research Institute, Daejeon (KR)

(72) Inventors: Jung Hee Suk, Daejeon (KR); Jimin Oh, Daejeon (KR); Minki Kim, Daejeon (KR); Yil Suk Yang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 149 days.

(21) Appl. No.: 13/909,938

(22) Filed: Jun. 4, 2013

(65) Prior Publication Data
US 2014/0159631 A1   Jun. 12, 2014

(30) Foreign Application Priority Data

Dec. 12, 2012   (KR) .................. 10-2012-0144139

(51) Int. Cl.
*H02P 6/18*   (2006.01)
*H02P 7/00*   (2006.01)

(52) U.S. Cl.
CPC   *H02P 7/00* (2013.01); *H02P 6/181* (2013.01); *H02P 6/182* (2013.01)

(58) Field of Classification Search
CPC ..................................... H02P 6/16; H02P 6/18
USPC ................................................... 318/400.34
See application file for complete search history.

(56) References Cited

U.S. PATENT DOCUMENTS

| | | | | |
|---|---|---|---|---|
| 4,422,027 | A * | 12/1983 | Mohlere | 318/687 |
| 5,023,528 | A * | 6/1991 | Saidin et al. | 318/400.34 |
| 5,280,222 | A * | 1/1994 | von der Heide et al. | 318/400.04 |
| 5,384,527 | A * | 1/1995 | Rozman et al. | 322/10 |
| 5,773,951 | A * | 6/1998 | Markowski et al. | 318/625 |
| 5,990,643 | A * | 11/1999 | Holling et al. | 318/400.34 |
| 6,483,266 | B2 * | 11/2002 | Miyazaki et al. | 318/400.34 |
| 7,138,776 | B1 * | 11/2006 | Gauthier et al. | 318/400.34 |
| 7,759,893 | B2 | 7/2010 | Akita | |
| 8,649,884 | B2 * | 2/2014 | MacArthur et al. | 700/40 |
| 2003/0222615 | A1 * | 12/2003 | Aono et al. | 318/625 |
| 2011/0057593 | A1 * | 3/2011 | Williams et al. | 318/400.26 |
| 2012/0280641 | A1 * | 11/2012 | Lejeune et al. | 318/400.09 |

FOREIGN PATENT DOCUMENTS

| | | |
|---|---|---|
| KR | 10-2001-0086914 B1 | 9/2001 |
| KR | 10-2010-0094764 B1 | 8/2010 |
| KR | 10-2011-0118478 B1 | 10/2011 |
| WO | WO 2007/099629 A1 | 9/2007 |

* cited by examiner

*Primary Examiner* — Kawing Chan (57) ABSTRACT

Provided is a motor position detecting unit that includes a first computing element configured to output three-phase back-electromotive foreces (back-EMFs) based on a linear computation; a second computing element configured to output three-phase back-EMF based on a non-linear computation; and a computing controller configured to receive a control signal, three-phase voltage and current, and selecting any one of the first and second computing elements based on the received control signal, the received three-phase voltages and currents, wherein the control signal includes information on operation modes of an external motor.

9 Claims, 7 Drawing Sheets

MOTOR POSITION DETECTING UNIT AND BRUSHLESS DC MOTOR SYSTEM

CROSS-REFERENCE TO RELATED APPLICATIONS

This U.S. non-provisional patent application claims priority under 35 U.S.C. §119 of Korean Patent Application No. 10-2012-0144139, filed on Dec. 12, 2012, the entire contents of which are hereby incorporated by reference.

BACKGROUND OF THE INVENTION

The present invention disclosed herein relates to a motor, and more particularly, to a motor position detecting unit and a brushless DC (BLDC) motor system to which the motor position detecting unit is applied.

A motor is a device for converting electrical energy into mechanical energy by using a force which is applied to a current in a magnetic field. The motor is classified into an AC motor and a DC motor according to the type of an input power source. The AC motor supplies a current to a coil of a stator to change a magnetic field and rotate a rotor. The DC motor supplies a certain current to the rotor to rotate it. In this case, the DC motor uses a brush to enable a current to flow in a certain direction regardless of a position of the rotor.

Recently, as a power electronic control technology develops, a brushless direct current (BLDC) motor that uses an electronic switching technology and does not use a commutator is being provided. Since the BLDC motor does not use the commutator, there are no limitations on a heat emission and an abrasion of the commutator due to mechanical friction. However, in order to control the BLDC motor, a separate device for detecting a position of the rotor is required.

SUMMARY OF THE INVENTION

The present invention provides a motor position detecting unit with enhanced performance and a BLDC motor system to which the motor position detecting unit has been applied.

Embodiments of the present invention provide motor position detecting unit in which includes a first computing element configured to output three-phase back-EMF on the basis of a linear computation; a second computing element configured to output three-phase back-electromotive forces (back-EMFs) on the basis of a non-linear computation; and a computing controller configured to receive a control signal, three-phase voltages and currents, and configured to select any one of the first and the second computing elements on the basis of the received control signal and the received three-phase voltages and currents, wherein the control signal includes information on operation modes of an external motor.

In example embodiments, the first computing element is a linear computing element and the second computing element is a non-linear computing element.

In example embodiments, the motor position detecting unit further comprises a position detector outputting a position signal of a motor rotor on the basis of an output of the selected computing element of the first and second computing elements.

In example embodiments, the computing controller comprises a register configured to store a first computing input sections, select a first computing input section on the basis of the control signal and output the selected the first computing input section; and a comparator configured to compare the first computing input section and the three-phase voltages and currents, and output a selection signal based on the result of the comparison.

In example embodiments, the selection signal is related to select any one of the first and second computing elements.

In example embodiments, the motor position detecting unit further comprises third to n-th computing elements computing the three-phase back-EMFs on the basis of a linear computation that is different from that of the first computing element.

In example embodiments, the register further includes second to m-th computing input sections other than the first computing input section. The third to n-th computing elements compute the three-phase back-EMFs corresponding to the three-phase voltages and currents that are included in the second to m-th computing input sections.

Another embodiment of present invention provides a brushless direct current (BLDC) motor system in which comprises a motor driving unit configured to output a plurality of switching signals on the basis of a control signal and a position signal; a pulse width modulation (PWM) inverter configured to output three-phase voltages on the basis of the plurality of switching signals; a BLDC motor configured to operate on the basis of the three-phase voltages; and a position detecting unit configured to sense a position of a rotor of the BLDC motor and configured to output the position signal. The position detecting unit in which comprises a first computing element configured to output three-phase back-electromotive forces (back-EMFs) on the basis of a linear computation; a second computing element configured to output the three-phase back-EMFs on the basis of a non-linear computation; and a computing controller configured to receive a control signal, the three-phase voltages and currents from the PWM inverter, and select any one of the first and second computing elements on the basis of the received control signal and the received three-phase voltages and currents. The control signal includes information on operation modes of the BLDC motor.

In example embodiments, the BLDC motor is sensor-less BLCD motor.

In example embodiments, the BLDC motor system further comprises a position detector configured to output a position signal of a rotor of the BLDC motor on the basis of an output of the selected computing element of the first and second computing elements.

In example embodiments, the computing controller comprises a register configured to store a first computing input section, and select the first computing input section on the basis of the control signal and output the selected first computing input section; and a comparator configured to compare the first computing input section and the three-phase voltages and currents and output a selection signal based on a result of the comparison.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Hereinafter, preferred embodiments of the present invention will be described with reference to the accompanying drawings to fully explain the present invention in such a manner that it may easily be carried out by a person with ordinary skill in the art to which the present invention pertains.

In the case of a sensor-less brushless direct current (BLDC) motor system, a position of a rotor of the BLDC motor is detected by computing a three-phase back-electromotive force (back-EMF) based on three-phase voltages and currents. In this case, the BLDC motor system performs computing by using a non-linear computing element. Since the non-linear computing element is designed through approximation, there is a large computing error. However, the BLDC motor system according to an embodiment of the present invention selectively performs any one of non-linear and linear computations according to a plurality of operating modes of BLDC motor (e.g., modes depending on a speed, a torque, a load, a current, etc.). Thus, the present invention provides a position detecting unit with enhanced performance and reliability and a BLDC motor system to which the position detecting unit has been applied.

Figure 1:
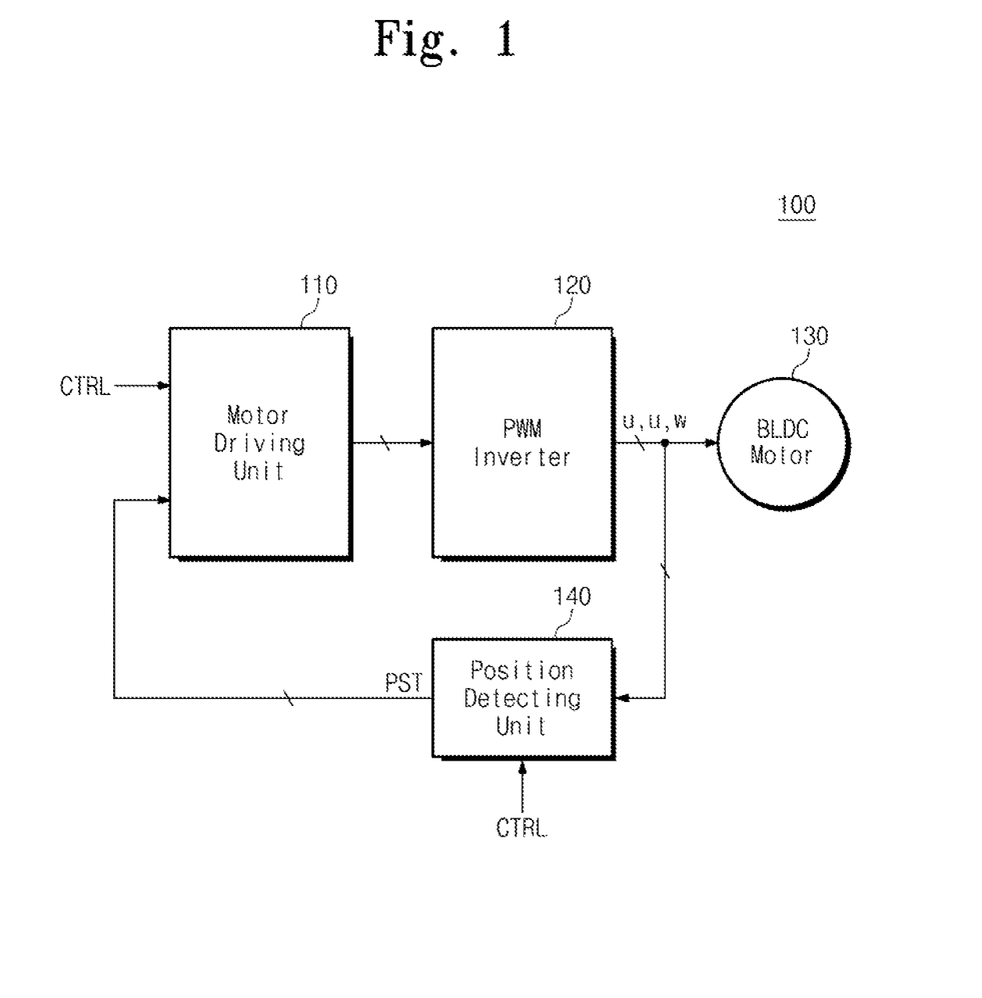
FIG. 1 is a block diagram of a brushless direct current (BLDC) motor system according to an embodiment of the present invention.

FIG. 1 is a block diagram of a BLDC motor system according to an embodiment of the present invention. Referring to FIG. 1, the BLDC motor system 100 includes a motor driving unit 110, a pulse width modulation (PWM) inverter 120, a BLDC motor 130, and a position detecting unit 140.

The motor driving unit 110 controls the PWM inverter 120 based on position signals PST and a control signal CTRL. For example, the motor driving unit 110 may receive the position signals PST from the position detecting unit 140. The motor driving unit 110 may receive the control signal CTRL from an external device. The control signal CTRL may be a signal that is generated based on information on a desired speed, a desired torque, etc. The motor driving unit 110 may control, based on the received position signals PST and the received control signal CTRL, a plurality of switches that are included in the PWM inverter 120.

For example, the motor driving unit 110 may sense a rotating speed of the BLDC motor 130 based on the position signals PST. If the rotating speed of the BLDC motor 130 is slower than the desired speed, the motor driving unit 110 controls the plurality of switches in the PWM inverter 120 so that frequencies of fundamental wave components of three-phase voltages u, v, w become high. In example embodiments, if the BLDC motor system 100 operates based on a three-phase power source, the PWM inverter 120 may include six power switches. In this case, the motor driving unit 110 will output six switching signals that control the six power switches.

The PWM inverter 120 outputs three-phase voltages u, v, w according to the control of the motor driving unit 110. For example, the PWM inverter 120 may include a plurality of switches. The PWM inverter 120 receives a plurality of switching signals from the motor driving unit 110 and outputs the three-phase voltages u, v, w. In example embodiments, the three-phase voltages u, v, w have a form of a square wave that includes harmonics. In example embodiments, the plurality of switches may be provided based on a power semiconductor device such as an insulated gate bipolar mode transistor (IGBT), a gate turn-off thyristor (GTO), a power diode, and so on.

The BLDC motor 130 may receive the three-phase voltages u, v, w and operate based on them. For example, the BLDC motor 130 includes a rotor and a stator. The rotor may be provided as a permanent magnet. The three-phase voltages u, v, w are applied to the stator. Since fundamental waves of the three-phase voltages u, v, w are sinusoidal waves with specific frequencies, magnetic fields that are generated from the stator by variations of the three-phase voltages u, v, w. An electromagnetic force occurs in the direction of the varying magnetic field by electromagnetic induction. The rotor rotates with the generated electromagnetic force.

In example embodiments, the BLDC motor 130 may not include a position sensor. In other words, the BLDC motor 130 may be provided as a sensor-less type. The back-EMF generated by an operation of the BLDC motor 130 includes positional information of the rotor. For example, the rotor of the BLDC motor 130 may be provided as a permanent magnet. That is, a rotating field occurs by the rotation of the rotor. As a result of this, a back-EMF occurs by electromagnetic induction. If the BLDC motor 130 operates based on the three-phase voltages u, v, w, three-phase back-EMFs generated from the BLDC motor 130 will have a difference of an electrical angle of 120. That is, it is possible to detect the position of the rotor of the BLDC motor 130 based on the difference between electrical angles of the three-phase back-EMFs, frequencies of the three-phase back-EMFs and so on.

The position detecting unit 140 may detect the position of the rotor in the BLDC motor 130 and output the position signal PST based on the result of detection. For example, the position detecting unit 140 may detect the three-phase voltages u, v, w output from the PWM inverter 120. The position detecting unit 140 may detect the three-phase currents $i_u, i_v, i_w$ output from the PWM inverter 120. The position detecting unit 140 may compute three-phase back-EMFs $E_u, E_v, E_w$ based on the received three-phase voltages u, v, w and the received three-phase currents $i_u, i_v, i_w$. In example embodiments, the position detecting unit 140 may selectively perform any one of non-linear and linear computations in order to compute the three-phase back-EMFs $E_u, E_v, E_w$. In other words, three-phase back-EMFs $E_u, E_v, E_w$ corresponding to the plurality of operating modes of the BLDC motor 130 (e.g., modes depending on a speed, a torque, a load, a temperature, an operating voltage, a current, etc.) may be computed.

Figure 2:
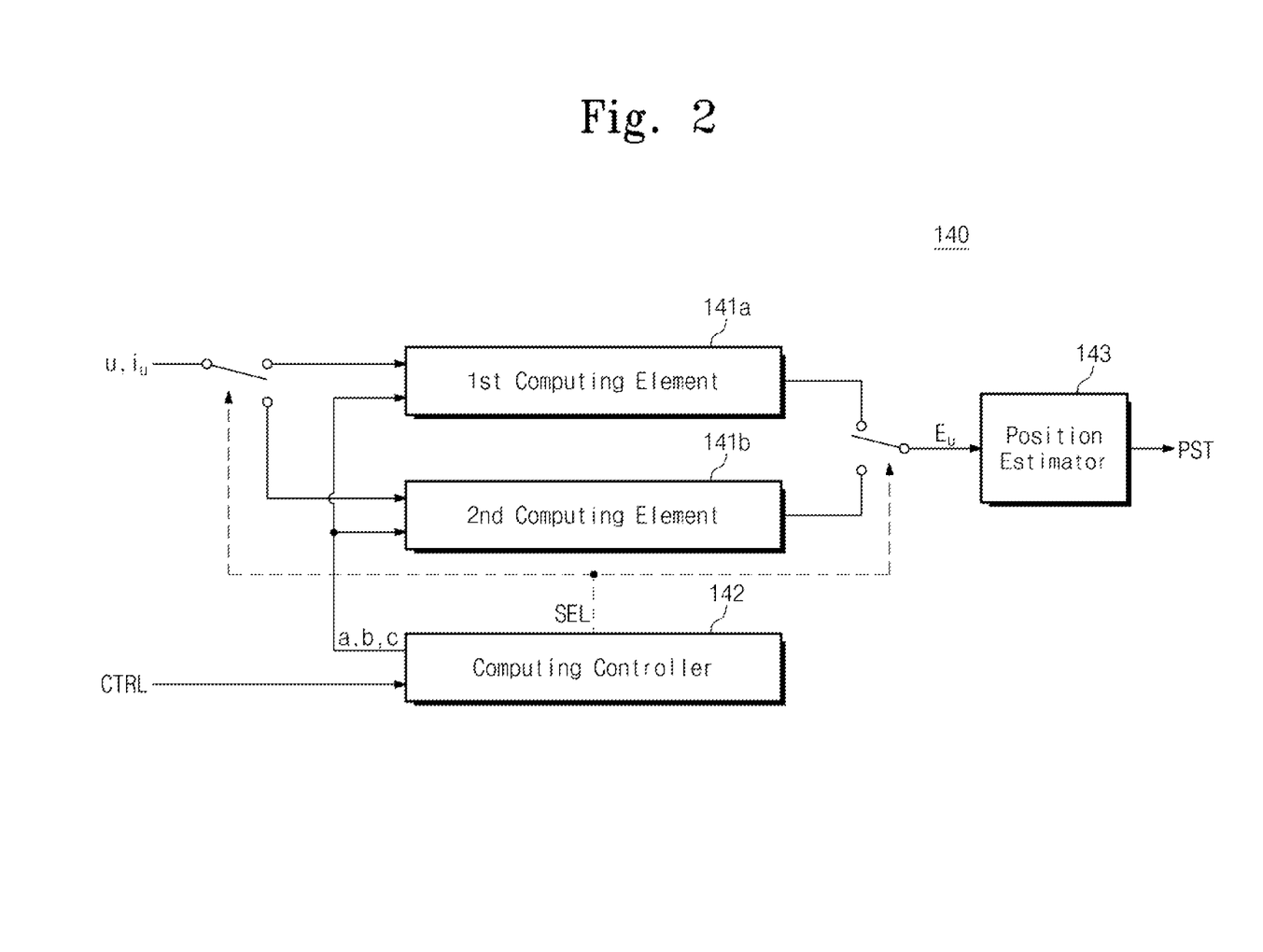
FIG. 2 is a detailed block diagram of a position detecting unit of FIG. 1.

FIG. 2 is a detailed block diagram of a position detecting unit of FIG. 1. In example embodiments, a method and configuration for computing u-phase back-EMF $E_u$ by a position detecting unit 140 are described with reference to FIG. 2. However, the scope of the present invention is not limited thereto and the position detecting unit 140 may also compute v-phase and w-phase back-EMFs $E_v$ and $E_w$ based on a method to be described below.

Referring to FIG. 2, the position detecting unit 140 may compute the u-phase back-EMF based on u-phase voltage and current u, $i_u$ and output a position signals PST. In example embodiments, the position detecting unit 140 selectively performs any one of linear and non-linear computations according to the operating mode of the BLDC motor 130. The position detecting unit 140 includes first and second computing elements 141a and 141b, a computing controller 142, and a position estimator 143. The first and second computing elements 141a and 141b receive u-phase voltage and current u and $i_u$. The first and second computing elements 141a and 141b perform a predetermined computing operation based on the u-phase voltage and current u and $i_u$. For example, the first computing element 141a may be linear. In this case, the first computing element 141 may perform computing such as Equation 1 below.

$$Y = aX + b \quad \text{Equation 1}$$

Referring to Equation 1, the term Y represents an output of the first computing element 141a, the term X represents an input of the first computing element 141a, and the terms a and b represent parameters.

The second computing element 142b may be non-linear. In this case, the second computing element 141b may perform computing such as Equation 2 below.

$$Y = 2/1 + e^{-eX} - 1 \quad \text{Equation 2}$$

Referring to Equation 2, the term Y represents an output of the second computing element 141b, the term X represents an input of the second computing element 141a, and the term c represents a parameter corresponding the operating mode of the BLDC motor 130. In example embodiments, Equation 2 represents a computing operation of Sigmoid computing element. However, the scope of the present invention is not limited thereto and the second computing element 141b may be provided as a computing element with a non-linear computing property.

In example embodiments, the parameters a, b, and c of the first and second computing elements 141a and 141b may be respectively included in the first and second computing elements 141a and 141b. In an example embodiments, the parameters a, b, and c of the first and second computing elements 141a and 141b may be received from the computing controller 142.

In example embodiments, if the first computing element 141a is linear and the second computing element 141b is non-linear, the first computing element 141a has more enhanced accuracy than that of the second computing element 141b. In example embodiments, if the second computing element 141b is non-linear, the second computing element 141b may compute three-phase back-EMFs for the whole operating range of the BLDC motor 130.

The computing controller 142 may receive u-phase voltage and current u and $i_u$ and a control signal CTRL. The computing controller 142 may select any one of the first and second computing elements 141a and 141b based on the received signals. For example, the control signal CTRL may include operating mode information of the BLDC motor 130. The computing controller 142 may select a computing input section INP based on the control signal CTRL. The computing controller 142 may determine whether the u-phase voltage and current u, $i_u$ are included in the selected computing input section INP. The computing controller 142 outputs, based on the result of the determination, a selection signal SEL that represents selection information of any one of the first and second computing elements 141a and 141b. In anexample embodiments, the computing controller 142 may transmit parameters corresponding to the operating modes of the BLDC motor 130 to the first and second computing elements 141a and 141b. The computing controller 142 will be described in more detail with reference to FIG. 3.

The position estimator 143 may output a position signal PST based on three-phase back-EMFs output from any one of the first and second computing elements 141a and 141b. For example, the position estimator 143 may receive the three-phase electromotive forces. The position estimator 143 may sense the position of a rotor based on frequencies, phase differences, etc. of the back-EMFs and output a position signal PST.

The position detector 140 according to an embodiment of the present invention described above may perform a linear or non-linear computation according to the operating mode of the BLDC motor 130. Thus, the reliability and performance of a motor position detecting unit may be enhanced.

Figure 3:
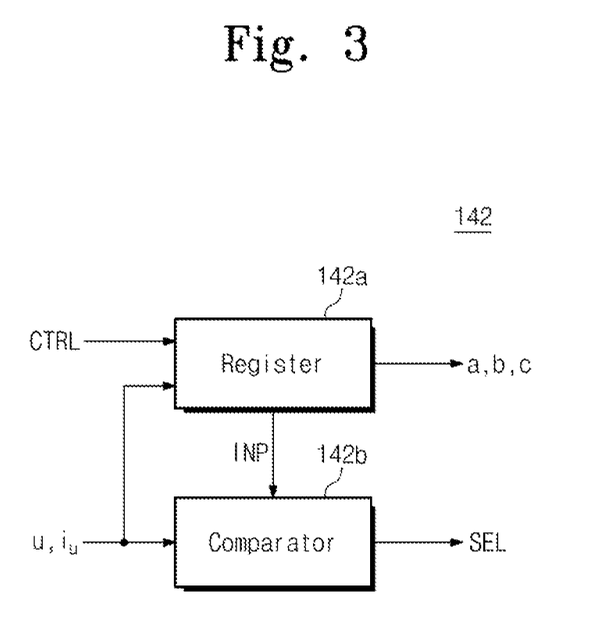
FIG. 3 is a detailed block diagram of a computing controller of FIG. 2.

FIG. 3 is a detailed block diagram of a computing controller of FIG. 2. Referring to FIGS. 2 and 3, the computing controller 142 includes a control register 142a and a comparator 142b.

The control register 142a may receive a control signal CTRL. The control register 142a may output an input section INP and parameters a, b, and c in response to the received control signal CTRL. For example, the control register 142a may include computing input sections INP that corresponds to a plurality of operating modes of the BLDC motor 130 (e.g., modes depending on a speed, a torque, a load, a temperature, etc.). The computing input section INP may represent the range of u-phase voltage and current u and $i_u$ that are output based on a linear computation by the position detecting unit 140. The control signal CRTL may include information on the operating mode of a BLDC motor system 100. The control register 142a may output information on an output input section INP corresponding to the received control signal CTRL. The control register 142a may include parameters a, b, and c of the first and second computing elements 141a and 141b. The control register 142a may receive u-phase voltage and current u and $i_u$ and output parameters a, b, and c corresponding to the received u-phase voltage and current u and $i_u$ to the first and second computing elements 141a and 141b.

The comparator 142b receives a computing input section INP from the control register 142a. The comparator receives the u-phase voltage and current u, $i_u$. The comparator 142 may determine whether the received u-phase voltage and current u and $i_u$ are included in the received computing input section INP, and output a selection signal SEL based on a result of the determination. In example embodiments, inputs and outputs of the first and second computing elements 141a and 141b may be selected based on the selection signal SEL.

Figure 4A:
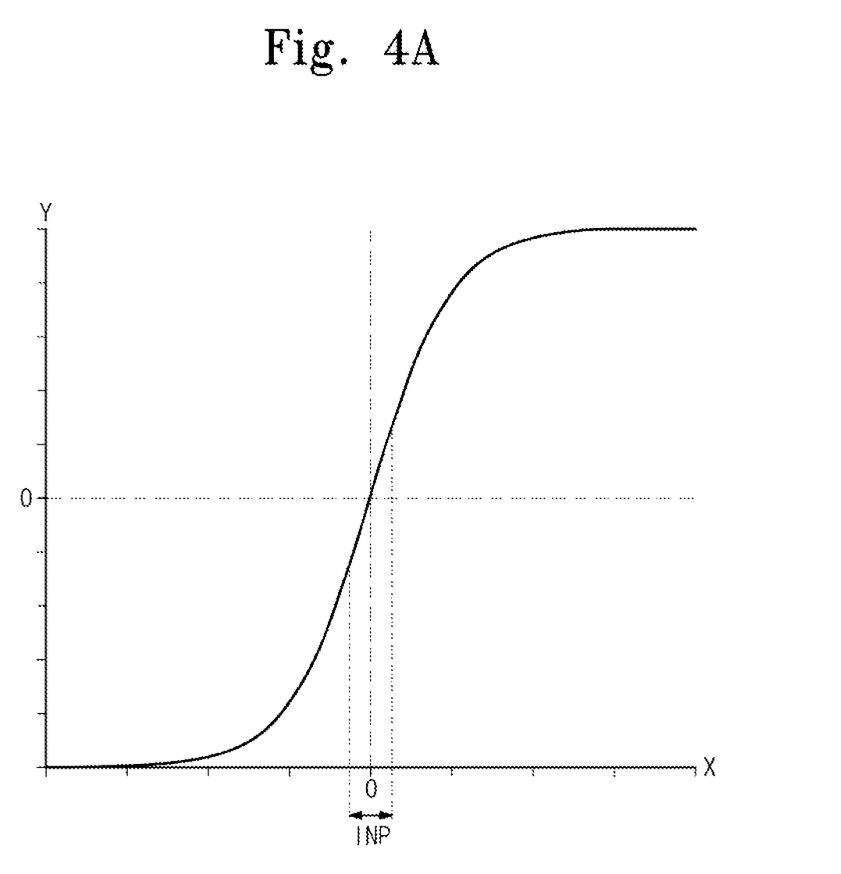
FIG. 4A is a graph of an operation of a position detecting unit of FIG. 1.

FIG. 4A is a graph for a describing an operation of a position detecting unit of FIG. 1. In example embodiments, the X axis of the graph in FIG. 4A represents u-phase voltage and the Y axis thereof represents u-phase back EMF. For simple description, an operation of the position detecting unit is described based on the relation between the u-phase voltage and the u-phase back-EMF. However, the scope of the present invention is not limited thereto.

Referring to FIG. 4A, the position detecting unit 140 may select any one of the first and second computing elements 141a and 141b according to the u-phase voltage u and compute the u-phase counter electromotive power. For example, the position detecting unit 140 may include a computing input section INP. If the u-phase voltage u is included in the computing input section INP, the position detecting unit 140 computes the u-phase back-EMF $E_u$ based on the first computing element 141a. On the contrary, if the u-phase is not included in the computing input section INP, the position detecting unit 140 computes the u-phase back-EMF $E_u$ based on the second computing element 141b. In example embodiments, the first computing element 141a may be linear and the second computing element 141b may be non-linear.

Figure 4B:
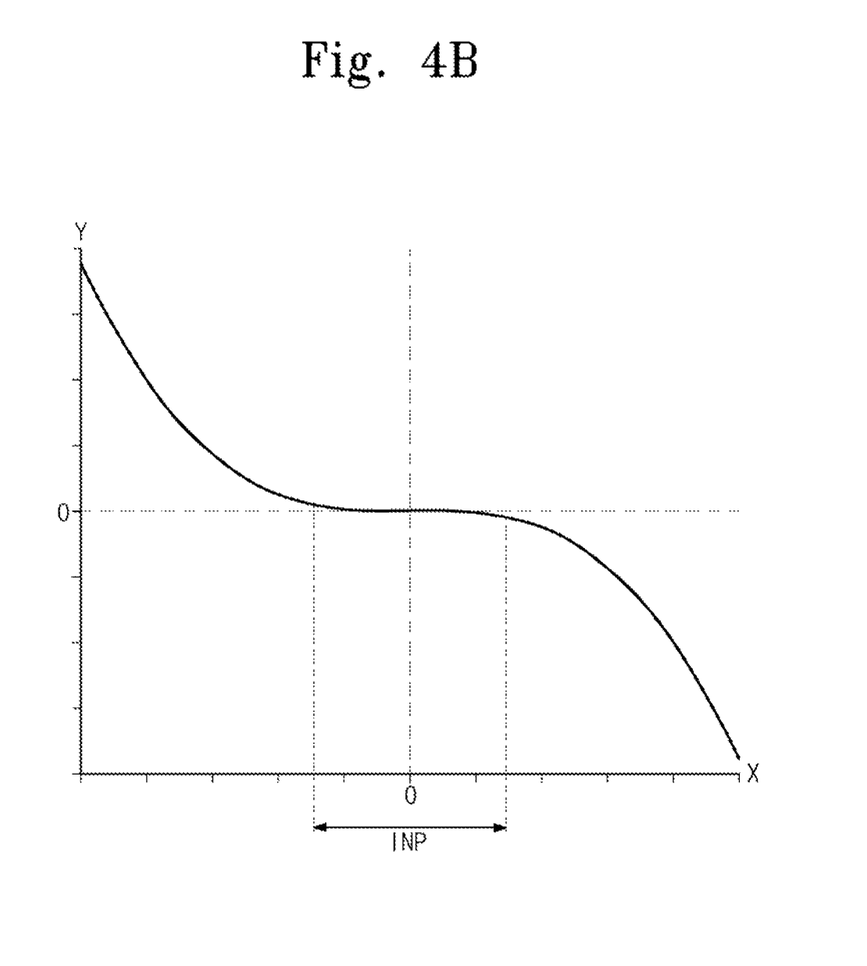
FIG. 4B is a graph of a computing input section.

FIG. 4B is a graph for a describing a method of selecting a computing input section of FIG. 4A. In example embodiments, the X axis of the graph of FIG. 4B represents u-phase phase voltage and the Y axis thereof represents the difference between outputs of the first and second computing elements 141a and 141b.

Referring to FIGS. 2 and 4B, the second computing element 141b provided as a non-linear computing element as described with reference to FIG. 2 may compute three-phase back-EMFs for the whole operating range of the BLDC motor 130. The difference between outputs of the first and second computing elements 141a and 141b corresponding to the computing input section INP is close to zero. In other words, if u-phase voltage u corresponding to the computing input section INP is received, the position detecting unit 140 may compute u-phase back-EMF $E_u$ through the first computing element 141a with more enhanced accuracy than that of the second computing element 141b.

The position detecting unit 140 according to the present invention described above detects a position of a rotor through any one of linear and non-linear computing elements based on received three-phase voltages. Thus, the present invention provides a motor position detecting unit with enhanced performance and reliability.

Figure 5:
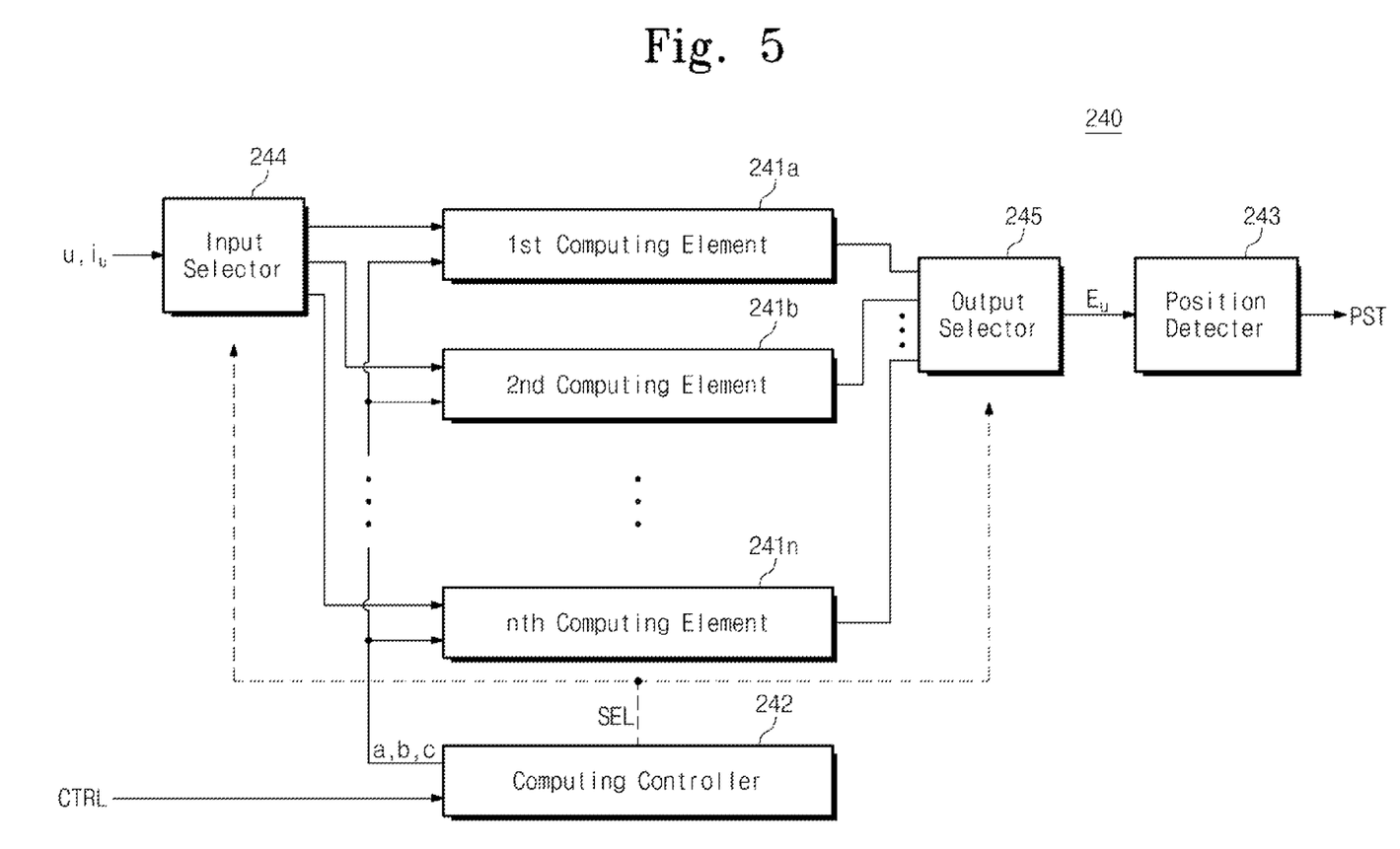
FIG. 5 is a block diagram of a position detecting unit according to another embodiment of the present invention.

FIG. 5 is a block diagram of a position detecting unit according to another embodiment of the present invention. Referring to FIG. 5, a position detecting unit 240 includes first to n-th computing elements 241a to 241n, a computing controller 242, a position detector 243, an input selector 244, and an output selector 245.

The first to n-th computing elements 241a to 241n may perform different computing operations. For example, each of the first to n-th computing elements 241a to 241n may be any one of linear and non-linear computing elements and include different parameters.

The computing controller 242 may include a plurality of computing input sections, unlike the computing controller 141 described with reference to FIG. 2. For example, the computing controller 242 may include first to third computing input sections INP_1 to INP_3. The operating modes of the BLDC motor corresponding to each of the first to third computing input sections INP_1 to INP_3 would be different from one another. The computing controller 242 may select any one of the first to third computing elements 241a to 241n based on the first to third computing input sections INP_1 to INP_3 and sensed u-phase voltage and current u, $i_u$. The computing controller 242 outputs a selection signal SEL and a parameter PAR based on the selected result. As an example, the parameter PAR output from the computing controller 242 would be a parameter corresponding to a computing element selected among the first to n-th computing elements 241a to 241n.

Since the position detector 243 has been described with reference to FIG. 2, a description thereof will be not repeated. The input selector 244 and the output selector 245 selects any one of the first to n-th computing elements 241a to 241n based on the selection signal SEL output from the computing controller 242, inputs u-phase voltage and current u, $i_u$, and outputs u-phase back-EMF $E_u$.

According to an embodiment of the present invention described above, the position detector 243 includes a plurality of computing input sections that perform a linear computation. If phase voltage and phase current that are included in the plurality of computing input sections are sensed, the position detector 243 selects any one of the first to n-th computing elements 241a to 241n and computes back-EMF. Thus, the present invention provides a motor position detector with enhanced reliability and performance.

Figure 6:
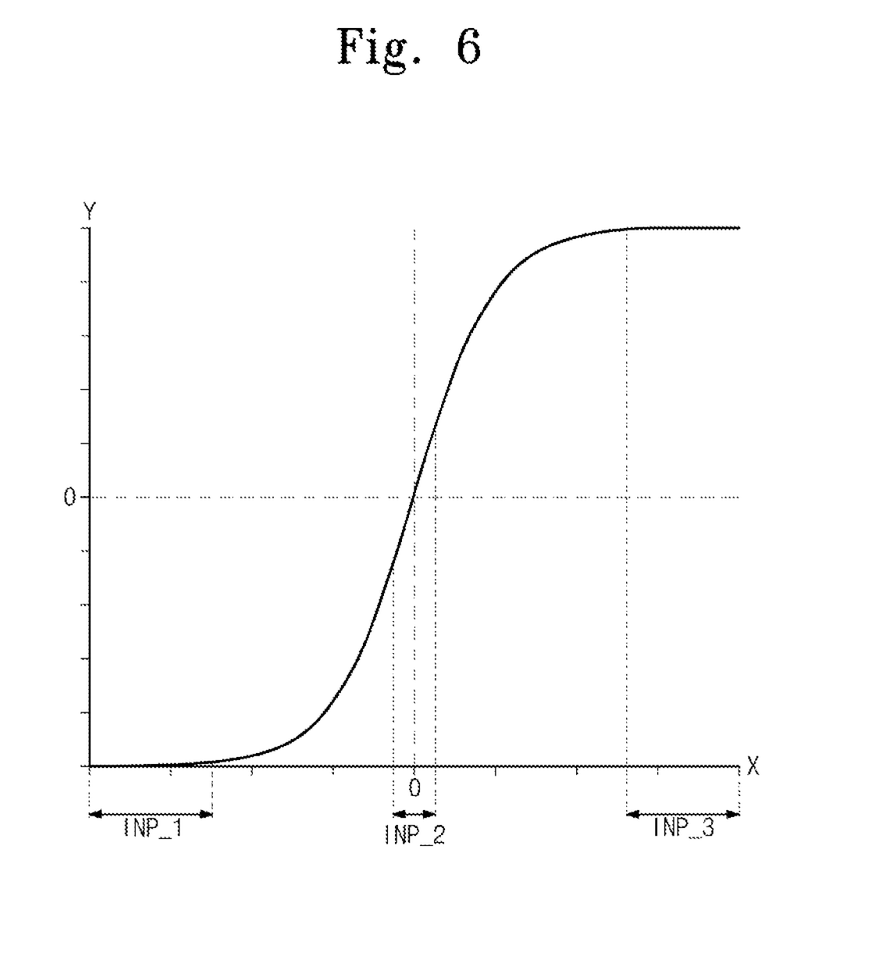
FIG. 6 is a graph of an operation of a position detecting unit of FIG. 5.

FIG. 6 is a graph of an operation of a position detecting unit of FIG. 5. The X axis of the graph of FIG. 6 represents u-phase voltage u and the Y axis thereof represents u-phase back-EMF E. As an example, assume that the position detecting unit 240 includes first to fourth computing elements 241a to 241d. In addition, assume that the first to third computing elements 241a to 241c are linear and the fourth computing element 241d is non-linear. However, the scope of the present invention is not limited thereto.

Referring to FIG. 6, the position detecting unit 240 includes the first to third computing input sections INP_1 to INP_3. As an example, the position detecting unit 240 may further include computing input sections other than the first to third computing elements INP_1 to INP_3 shown in FIG. 6.

The position detecting unit 240 may sense u-phase voltage u. If the sensed u-phase voltage u is included in any one of the first to third computing input sections INP_1 to INP_3, the position detecting unit 240 computes u-phase back-EMF $E_u$ based on a linear computation. For example, the position detecting unit 240 may include first to third computing elements 241a to 241c that correspond respectively to first to third computing input sections INP_1 to INP_3. The position detecting unit 240 determines where the u-phase voltage u is included among the first to third computing input sections INP_1 to INP_3. According to the determined result, the position detecting unit 240 will compute u-phase back-EMF $E_u$ based on any one of the first to third computing elements 241a to 241c. As an example, if u-phase voltage u is not include in the first to third computing input sections INP_1 to INP_3, the position detecting unit 240 may compute u-phase back-EMF $E_u$ based on the fourth computing element 241d (that is non-linear).

An operation of the position detecting unit 240 described with reference to the graph of FIG. 6 includes a plurality of computing input sections, unlike the operation of the position detecting unit 140 described with reference to the graph of FIG. 4A. Thus, since a linear computing element with higher computing accuracy than a non-linear computing element is used in the plurality of computing input sections, a motor position detecting unit with enhanced reliability and performance and a BLDC motor system to which the position detecting unit has been applied are provided.

As an example, the operation of the position detecting unit described with reference to the graph of FIG. 6 may be applied not only to the position detecting unit 240 of FIG. 5 but also to the position detecting unit 140 of FIG. 2. For example, the computing controller 140 of the position detecting unit 140 of FIG. 2 may further a plurality of computing input sections INP_1 to INP_n. The computing controller may further a plurality of parameters that correspond to the plurality of computing input sections INPs. The computing controller 140 may sense u-phase voltage u. In this case, the computing controller 140 may output a parameter corresponding to a computing input section INP in which the u-phase voltage u is included. In other words, the computing controller 140 may regulate parameters a, b, c of the first and second computing elements 141a and 141b to perform a linear computation on the plurality of input sections INP_1 to INP_n.

The motor position detecting unit according to the present invention described above selectively performs any one of the linear and non-linear computations based on the plurality of computing input sections. Thus, a motor position detecting unit with enhanced reliability and performance and a BLDC motor system to which the position detecting unit has been applied are provided.

While particular embodiments of position detection of a BLDC motor system have been described in detail, several variations may be made without departing from the scope of the present invention. For example, components of the position detecting unit may be applied to other systems that need a non-linear computation. Therefore, the scope of the present invention should be not limited to the embodiments described above and should be defined by the following claims and equivalents thereof.

What is claimed is:

1. A motor position detecting unit comprising:
a plurality of computing elements including:
a first computing element configured to output three-phase back-electromotive forces (back-EMFs) on the basis of a linear computation; and
a second computing element configured to output the three-phase back-EMFs on the basis of a non-linear computation; and
a computing controller configured to receive a control signal, three-phase voltages and currents, and configured to select any one of the plurality of computing elements on the basis of the received control signal and the received three-phase voltages and currents,
wherein the computing controller includes:
a register configured to store one or more computing input sections, select one of the computing input sections on the basis of the control signal, and output the selected computing input section; and
a comparator configured to compare the selected computing input section and the three-phase voltages and currents, and output a selection signal based on a result of the comparison, and
wherein the control signal includes information on operation modes of an external motor.

2. The motor position detecting unit of claim 1, wherein the first computing element is a linear computing element and the second computing element is a non-linear computing element.

3. The motor position detecting unit of claim 1, further comprising a position detector outputting a position signal of a rotor of the external motor on the basis of an output of the selected computing element of the plurality of computing elements.

4. The motor position detecting unit of claim 1, wherein the selection signal is related to selecting any one of the plurality of computing elements.

5. The motor position detecting unit of claim 1, wherein the plurality of computing elements further includes a third computing element computing the three-phase back-EMFs on the basis of a linear computation that is different from that of the first computing element.

6. The motor position detecting unit of claim 5, wherein the one or more computing input sections include first and second computing input sections, the first computing input section having a range that is different from that of the second input section,
wherein the first computing element computes the three-phase back-EMFs when the three-phase voltages and currents are included in the first computing input section, and
wherein the third computing element computes the three-phase back-EMFs when the three-phase voltages and currents are included in the second computing input section.

7. A brushless direct current (BLDC) motor system comprising:
a motor driving unit configured to output a plurality of switching signals on the basis of a control signal and a position signal;
a pulse width modulation (PWM) inverter configured to output three-phase voltages on the basis of the plurality of switching signals;
a BLDC motor configured to operate on the basis of the three-phase voltages; and
a position detecting unit configured to sense a position of a rotor of the BLDC motor and configured to output the position signal, wherein the position detecting unit comprises:
a first computing element configured to output three-phase back-electromotive forces (back-EMFs) on the basis of a linear computation;
a second computing element configured to output the three-phase back-EMFs on the basis of a non-linear computation; and
a computing controller configured to receive a control signal, the three-phase voltages and currents from the PWM inverter, and select any one of the first and second computing elements on the basis of the received control signal and the received three-phase voltages and currents,
wherein the computing controller includes:
a register configured to store one or more computing input sections, and select one of the computing input sections on the basis of the control signal, and output the selected computing input section; and
a comparator configured to compare the selected computing input section and the three-phase voltages and currents, and output a selection signal based on a result of the comparison, and
wherein the control signal includes information on operation modes of the BLDC motor.

8. The BLDC motor system of claim 7, wherein the BLDC motor is a sensor-less BLDC motor.

9. The BLDC motor system of claim 7, further comprising a position detector configured to output a position signal of a rotor of the BLDC motor on the basis of an output of the selected computing element of the first and second computing elements.

* * * * *